Figure 1:
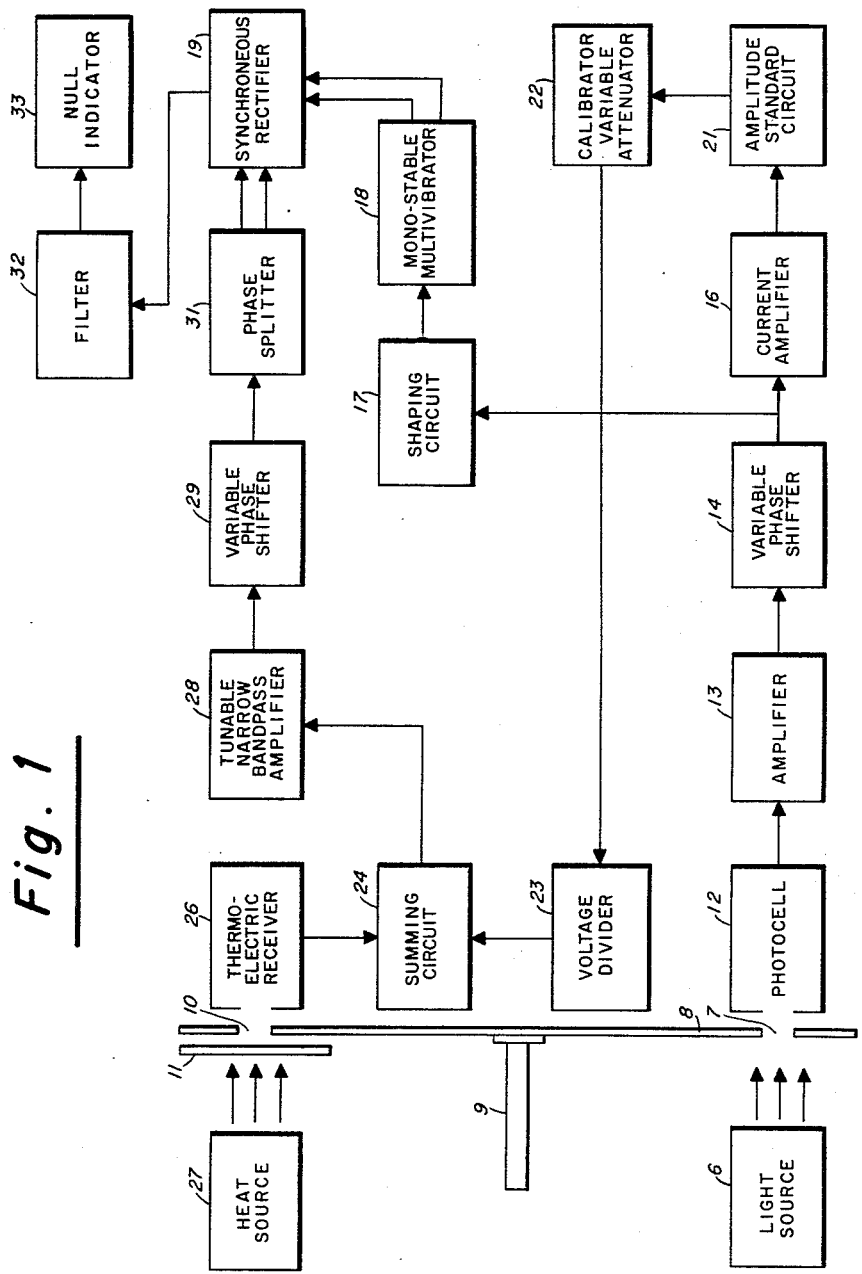

June 14, 1960 K. F. CUFF 2,941,085
PHASE SENSITIVE AMPLIFIER
Filed Sept. 14, 1959 2 Sheets-Sheet 1

INVENTOR.
KERMIT F. CUFF
BY
Paul L. Critchlow
ATTORNEYS

June 14, 1960 K. F. CUFF 2,941,085
PHASE SENSITIVE AMPLIFIER
Filed Sept. 14, 1959 2 Sheets-Sheet 2

INVENTOR.
KERMIT F. CUFF
BY
ATTORNEYS

United States Patent Office 2,941,085
Patented June 14, 1960

2,941,085
PHASE SENSITIVE AMPLIFIER

Kermit F. Cuff, Palo Alto, Calif., assignor, by mesne assignments, to the United States of America as represented by the Secretary of the Navy Filed Sept. 14, 1959, Ser. No. 839,984

6 Claims. (Cl. 250—214)

This invention relates to a thermo-electric receiver response tester, and more particularly to a thermo-electric receiver response tester utilizing the null type of indication and technique.

The need has long been felt for a simple reliable thermo-electric receiver response tester capable of testing a thermo-electric receiver over a wide range of interruption frequencies which is simple to operate and does not require an extensive amount of time in calibration setup or test runs.

According to the invention a thermo-electric receiver under test is placed in the radiation path of heat source such as a ribbon filament lamp. A photocell is placed in the radiation path of a light source such as an incandescent lamp. Both the heat and light sources are interrupted simultaneously by a chopper, which utilizes apertures varying sinusoidally with rotation of the chopper blade. While both the heat and light sources are interrupted sinusoidally by the same chopper, the variations are 180° out of phase from one another, i.e. the thermo-electric receiver is receiving maximum radiation from the heat source at the time the photocell is receiving minimum radiation from the light source. The output of the photocell is amplified, passed through a variable phase shifter, further amplified, and passed through an amplitude standard circuit. This standard amplitude is then attenuated to a level approximating the output of the thermo-electric receiver, and passed through a narrow band-pass amplifier which is tuned to the frequency of interruption of the chopper. The output of this amplifier is then passed through a second phase shifter, a phase splitter, and rectified in a synchronous rectifier. The output of the rectifier is then filtered and metered. The synchronous rectifier is synchronized by the output of the first variable phase shifter. The second phase shifter is adjusted to bring the signal to be rectified in phase with the synchronous rectifier. The output from the thermo-electric receiver is then compared with the output from the photocell channel after attenuation. The attenuator in the photocell channel can then be adjusted to balance out the output from the thermo-electric receiver as indicated by the null indicator. The final phase adjustment can be made by the first variable phase shifter to bring the output from the photocell and thermo-electric receiver precisely in opposite phase relationship. The variable attenuator in the photocell channel can be calibrated in voltage output to indicate the output of the thermo-electric receiver. Obviously the speed of the rotation of the chopper can be varied necessitating merely a re-tuning of the band-pass amplifier and readjustment of the two phase shifters to test the response of the thermo-electric receiver at different interruption frequencies.

It is thus an object of the present invention to provide a thermo-electric receiver response tester utilizing a null type of indication.

Another object is the provision of a thermo-electric receiver response tester capable of use over a wide range of thermal interruption frequencies.

A further object of the invention is to provide a thermo-electric receiver response tester with a minimum of precision components.

Still another object is to provide a thermo-electric receiver response tester with self-contained and easily operated calibration.

Figure 2:
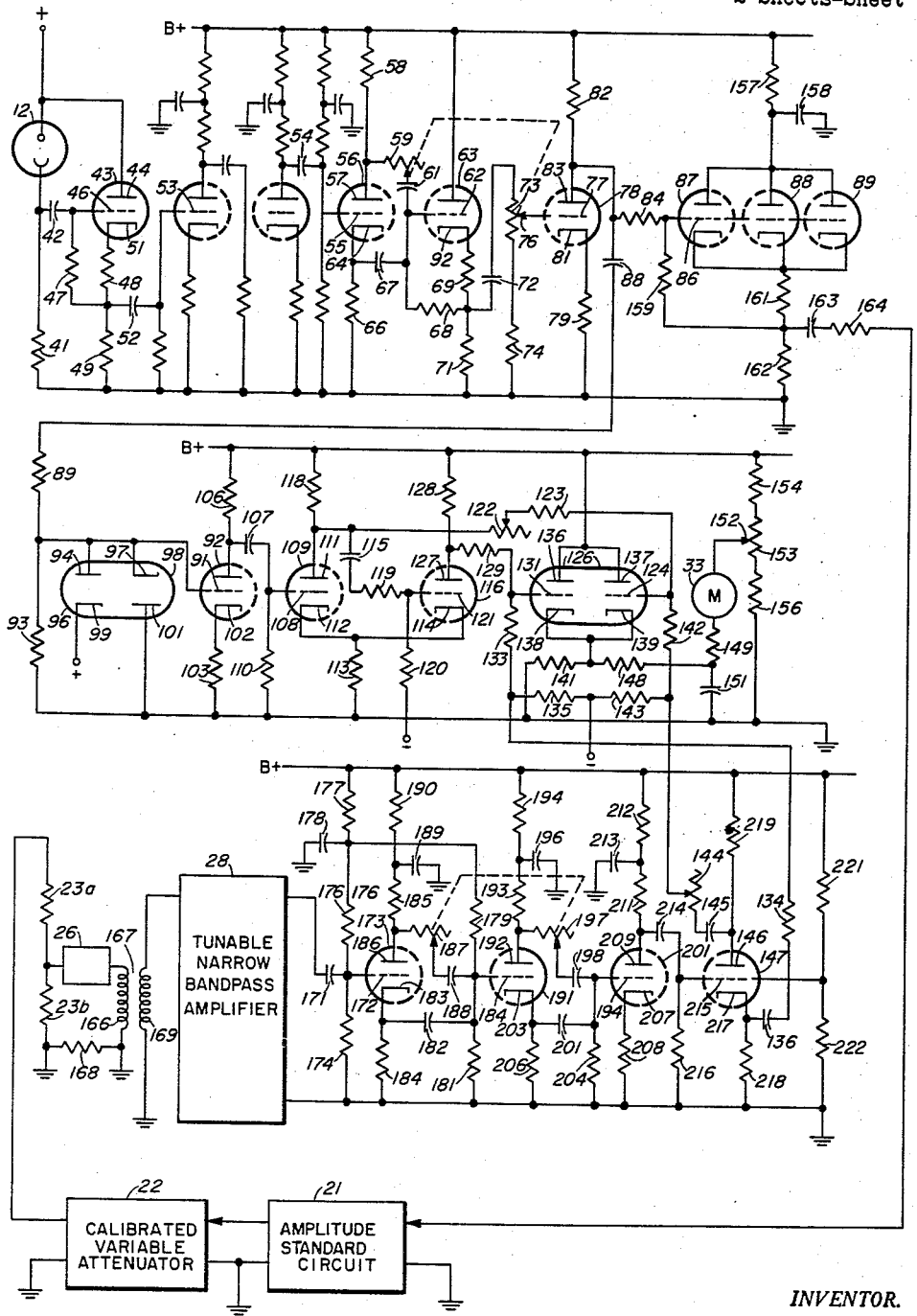

Other objects and many of the attendant advantages of this invention will be readily appreciated as the same is better understood by reference to the following detailed description when considered in connection with accompanying drawings in which like reference numerals designate like parts throughout the figures thereof and wherein:

Fig. 1 illustrates a block diagram of a preferred embodiment of the invention; and Fig. 2 shows a schematic diagram of the major components of Fig. 1.

Referring now to the drawings, there is shown in Fig. 1 a light source 11, a photocell 12 coupled to an amplifier 13. The output from amplifier 13 is coupled to variable phase shifter 14 the output of which is coupled to current amplifier 16 and shaping circuit 17. The output of shaping circuit 17 is coupled to bistable multivibrator 18, the output of which is coupled to synchronous rectifier 19. The output of current amplifier 16 is fed through amplitude standard circuit 21, calibrated attenuator 22, and voltage divider 23 to summing circuit 24. Also coupled to summing circuit 24 is the output thermo-electric receiver 26 which is energized by heat source 27. The output of summing circuit 24 is coupled through tunable narrow band-pass amplifier 28, variable phase shifter 29, and phase splitter 31 to synchronous rectifier 19. The output of synchronous rectifier 19 is taken through filter 32 to null indicator 33.

Referring to Fig. 2, photo-electric cell 12 is connected between a positive voltage source and ground through load resistor 41. The junction of photo-electric cell 12 and resistor 41 is coupled through capacitor 42 to cathode follower 43. Plate 44 of cathode follower 43 is connected directly to a positive source. Grid 46 is connected through resistor 47 to the junction of resistors 48 and 49 connected in series between cathode 51 and ground. The junctions of resistors 48 and 49 is also connected through capacitor 52 to grid 53 of a resistance coupled amplifier indicated generally at 13. The output of amplifier 13 is taken through load resistor 58 to B plus and also through variable resistor 59 and capacitor 61 to grid 62 of triode 63. Cathode 64 of triode 56 is connected through resistor 66 to ground and through capacitor 67 to grid 62. Grid 62 of triode 63 is also connected through resistor 68 to the junction of resistors 69 and 71. Resistors 69 and 71 are connected in series between cathode 72 and ground. Also connected to the junction of resistors 69 and 71 is capacitor 72, which is in turn connected through resistors 73 and 74 to ground. Contact 76 on resistor 73 is connected to grid 77 of triode 78. Resistor 79 is connected from cathode 81 of triode 78 to ground. Resistor 82 is connected between plate 83 of triode 78 and B plus. Also connected to plate 83 are resistors 84, the other end of which is connected to grid 86 of triode 87, and capacitor 88 which is connected through resistor 89 to grid 91 of triode 92. Resistor 93 is connected between grid 91 and ground. Also connected to grid 91 is plate 94 of diode 96 and cathode 97 of diode 98. Cathode 99 of diode 96 is connected to a positive voltage and plate 101 is connected directly to ground. Cathode 102 of triode 92 is connected through resistor 103 to ground. Plate 104 is connected through resistor 106 to B plus and through capacitor 107 to grid 108 of triode 109. Resistor 111 is connected between grid 108 and ground. Cathode 112 is connected through resistor 113 to ground and to cathode 114 of triode 116. Plate 117 is connected through resistor 118 to B plus, through resistor 119 to grid 121, and through variable resistor 122 and resistor 123 in series to grid 124 of triode 126. Plate 127 of triode 116 is connected through resistor 128 to B plus and through resistor 129 to grid 131 of triode 132. Grid 131 is also connected through resistor 133 and resistor 134 in series to capacitor to 136. The junction of resistors 133 and 134 is connected through resistor 135 to a negative potential. Plates 136 and 137 are connected directly to B plus. Grid 124 is connected through resistor 141 and resistors 142 and 143 to a negative potential. The junction of resistors 142 and 143 is connected through variable resistor 144 and capacitor 145 to plate 146 of triode 147. Cathodes 138 and 139 of triodes 132 and 126, respectively are also connected through resistors 148 and 149 to null indicator 33. The junction of resistors 148 and 149 is connected through capacitor 151 to ground. The other side of meter 33 is connected to contact 152 on resistor 153. One end of resistor 153 is connected through resistor 154 to B plus and the other end through resistor 156 to ground.

Triodes 87, 88 and 89 are all connected with their respective cathodes, grids, and plates in parallel i.e. connected directly together. The plates of triodes 87, 88 and 89 are connected through resistor 157 to B plus and capacitor 158 to ground. The grids of triodes 87, 88 and 89 are connected through resistor 159 to the junction of resistors 161 and 162 which are connected in series between the cathodes of triodes 87, 88 and 89 and ground. The junction resistors 161 and 162 are also connected through capacitor 163 and resistor 164 to the input of the amplitude standard circuit 21. The output of amplitude standard 21 is coupled through a calibrated variable attenuator 22 to a voltage divider 23. Voltage divider 23 (Fig. 1) is shown as resistors 23a and 23b which are connected in series between the output of calibrated variable attenuator 22 and ground. The junction of resistors 23a and 23b is connected to one side of thermo-electric receiver 26. The other side of thermo-electric receiver 26 is coupled through primary winding 166 of transformer 167 to ground. Isolating resistor 168 is connected between the grounded side of winding 166 and the grounded end of resistor 23b. Secondary winding 169 is connected between ground and the input of tunable narrow band-pass amplifier 28. The output of amplifier 28 is connected through capacitor 171 to grid 172 of triode 173. Grid 172 is also connected through resistor 174 to ground, and through resistors 176 and 177 in series to B plus. The junction of resistors 176 and 177 is connected through capacitor 178 to ground and through resistors 179 and 181 to ground. The junction of resistors 179 and 181 is connected through capacitor 182 to cathode 183. Resistor 184 is connected between cathode 183 and ground. Plate 186 of triode 173 is connected through resistors 187 and 188, in series, to B plus. The junction of resistors 187 and 188 is connected through capacitor 189 to ground. Plate 186 is also connected through variable resistor 187 and capacitor 188 to grid 189 of triode 191. Grid 189 is also connected to the junction of resistors 179 and 181. Plate 192 is connected through resistor 193 and resistor 194, in series, to B plus. The junction of resistors 193 and 194 is connected through capacitor 196 to ground. Plate 192 is connected through variable resistor 197 and capacitor 198 to grid 199 of triode 201. Grid 199 is also connected through capacitor 202 to cathode 203 of triode 191, and through resistor 204 to ground. Cathode 203 is also connected through resistor 206 to ground. Cathode 207 of tube 201 is connected to resistor 208 to ground. Plate 209 is connected through resistors 211 and 212 in series to B plus. The junction of resistors 211 and 212 is connected through capacitor 213 to ground. Plate 209 is also connected through capacitor 214 to grid 215 of triode 147. Grid 215 is also connected to resistor 216 to ground. Cathode 217 of triode 147 is connected through resistor 218 to ground. Plate 146 is connected through resistor 219 to B plus. Grid 215 is also connected to the junction of resistors 221 and 222, which are connected in series between B plus and ground.

*Operation*

Referring again to Fig. 1, light source 6 radiates light through aperture 7 of rotating chopper blade 8. Blade 8 is attached to shaft 9, which is rotating at a predetermined speed. The light passing through aperture 7 impinges on photocell 12 which generates an output proportional to the amount of light passing through aperture 7. Aperture 7 is a groove in disc 8, the width of which varies sinusoidally with rotation of disc 8. The output of photocell 12 will then be a sine wave at a frequency determined by the speed of rotation of disc 8. This output is then amplified in amplifier 13 and passed through variable phase shifter 14. The output of variable phase shifter 14 is then shaped into sync pulses in shaping circuit 17, the details of which will be hereinafter described, to trigger bistable multivibrator 18. The outputs of bistable multivibrator 18 are coupled as synchronizing signals to synchronous rectifier 19. The output of variable phase shifter 14 is also amplified in current amplifier 16 and passed to amplitude standard circuit 21 and calibrated attenuator 22. The amplitude standard circuit 21 and calibrated attenuator 22 can be any of the commercially available amplitude calibrators such as the General Radio "microvolter." The amplitude standard circuit is merely an adjustable attenuator the output of which is metered at a particular standard amplitude, for example one volt. This output is passed through a variable calibrated attenuator indicated at 22. The output of variable calibrated attenuator 22 is then reduced through voltage divider 23 and passed into the input of summing circuit 24. At this point of time shutter 11 is closed so that there is no output from thermo-electric receiver 26. The output of summing circuit 24 is then amplified in a conventional tunable band-pass amplifier 28. Obviously, amplifier 28 is tuned to the interruption frequency of chopper blade 8. The output of amplifier 28 is then passed through a variable phase shifter 29 to phase splitter 31. The output of phase splitter 31 is then rectified in synchronous rectifier 19, filtered in filter 32 and indicated at meter 33. The initial calibration at this point is accomplished with variable phase shifter 29, i.e. variable phase shifter 29 is adjusted so that the output of phase splitter 31 is exactly synchronized, or in phase, with bistable multivibrator 18. This overcomes any phase shift present introduced through the amplifier 28.

Once variable phase shifter 29 is set which is done by merely adjusting for a maximum indication a null indicator 33, shutter 11 is raised and heat source 27 is allowed to radiate heat through aperture 10 of chopper blade 8. The heat passing through aperture 10 will then impinge upon thermo-electric receiver 26, which can be any of the well known types such as a thermo-couple or thermopile, etc. Thermo-electric receiver 26 will then generate an output voltage proportional to the amount of heat passing through aperture 10. Aperture 10 is varied sinusoidally in width with the rotation of chopper blade 8 but 180° out of phase with the aperture 7 i.e. when aperture 10 is at a maximum width aperture 7 is at a minimum width. Thus, the output from thermo-electric receiver 26 as seen by summing circuit 24 will be 180° out of phase with the signal received with the other input to summing circuit 24 from voltage divider 23. The calibrated variable attenuator 22 can then be adjusted for a cancelling of the two signal inputs at summing circuit 24. This will be indicated by a dip or null at null indicator 33. To compensate for any differences in phase or response time between photocell 12 and thermo-electric receiver 26 variable phase shifter 14 can also be adjusted at this point for a further null rendering the systems even more accurate.

Referring now to Fig. 2 the output from photo-electric cell 12 is developed across resistor 41 and applied through capacitor 42 to cathode follower 43. The output of cathode follower 43 taken through capacitor 49 is amplified through conventional amplifier resistance coupled amplifier 13 and applied to grid 55 of triode 56. Triodes 56, 63 and 78 comprise the variable phase shifter 14 of Fig. 1. As will be understood, the phase shift is accomplished by varying the resistance of resistors 59 and the pick off point of resistor 73. Since resistors 59 and 73 form a part of an RC network, the phase will vary accordingly. The output of triode 78 is taken at plate 83 through resistor 89 to grid 91 of triode 92. Triodes 92 and diodes 96 and 98 comprise the shaping circuit indicated generally at 17 in Fig. 1. Diode 98 is a conventional negative clipper and diode 96 is a biased positive clipper i.e. when the signal at the plate 94 rises above the potential applied to cathode 99, diode 96 will conduct, clamping grid 91 at the potential applied to cathode 99. Thus, the negative half of the wave form coupled through resistor 89 will be lost or clamped in diode 98, and the positive half will be limited or clipped by diode 96. This wave form will then be amplified in triode 92 which is a conventional class A cathode biased amplifier. The output taken in plate 104 through capacitor 107 will be differentiated, appearing in the grid 108 of triode 109 as a sharp going negative pulse. Triodes 109 and 116 together comprise a monostable multivibrator shown generally by block 18 in Fig. 1. Grid 121 is tied to a negative potential through resistor 120 holding triodes 116 at cut off. Triode 109 is then normally conducting having no fixed bias applied. A negative pulse at grid 108 of triode 109 cuts triode 109 off raising the plate voltage at 117 and the voltage at grid 121 of triode 116, driving triode 116 into a conductive state. At this point the plate current of triode 116 through common cathode resistor 113 holds triode 109 at cut off. As capacitor 115 charges to the B plus potential through resistor 118 the current through resistor 120, which originally rendered tube 116 in a conducting state, will decrease to the point where grid 121 will again cut off tube 116, and tube 109, no longer having bias applied through common cathode resistor 113, will resume its original conducting state, being in a condition to receive the next negative pulse from plate 104. The output of multivibrator 18 is taken from plates 111 and 127 to grids 131 and 124 of triodes 132 and 126 respectively. Triodes 126 and 132 comprise the synchronous rectifier indicated generally at 19 in Fig. 1. Grids 124 and 131 are connected through resistors 143, 143, and resistors 133 and 135, respectively, to a negative potential. This fixed bias holds tubes 126 and 132 below cut off with no signal from multivibrator 18. Multivibrator 18 in effect gates tube 126 when its grid is positive, and tube 132 when grid 131 is positive. The output from triodes 126 and 132 is taken across common cathode load resistor 131 through a filter comprising resistors 148 and 149 and capacitor 151 to one side of meter 33. The other side of meter 33 is connected to a positive potential on a voltage divider consisting of resistors 153, 154 and 156, connected in series between ground and B plus. With no input, contact 152 on resistor 153 is adjusted until the voltage is equal on each side of meter 33. Meter 33 is preferably a zero center type of D.C. galvanometer. Signals originating from photo-electric cell 12 are attenuated to a level comparable to that generated in thermo-electric receiver 26. The output of voltage divider 23a and 23b i.e. their junction is then placed in series with voltage divider thermo-electric receiver 26 across primary 166 of transformer 167. At this point the two signals, i.e. from the calibrated variable attenuator 22 and from the thermo-electric receiver 26 will be 180° out of phase and in opposing relationship. The secondary winding 169 of transformer 167 is then coupled to the tunable narrow band-pass amplifier 28, which again is tuned to the frequency of chopper blade 8. The output of tunable narrow band-pass amplifier 28 is then taken through capacitor 171 to the input or control grid of triode 173. Triode 173 and triode 191 comprise the variable phase shifter indicated at 14 in Fig. 1. The phase shift is again created by varying the resistance of resistors 187 and 197 which are in the output coupling circuits of triodes 173 and 191 respectively. Since these are RC coupling networks varying the resistance will vary the phase shift. The output of the phase shifter is then passed to the grid of RC resistance coupled amplifier 201 the output of which is taken from plate 209 through capacitor 214 to grid 215 of triode 147. Triode 147 is a phase splitter indicated generally as at 14 in Fig. 1. The loans of phase splitter 147 are equal resistors 218 and 219, located in the cathode 217 and plate 146, respectively, of the tube. The outputs are coupled to the control grids 131 and 124 of synchronous rectifier 19. Thus it is seen that only one-half of the signal will be coupled through the synchronous rectifier at a time, depending on which side of multivibrator 18 is conducting, and that maximum signal will appear at cathodes 138 and 139 of synchronous rectifier 19 when the signals coupled from phase splitter 31 are exactly synchronized or in phase with the multivibrator 18 cycle.

*Summary*

Again the initial calibration is made with shutter 11 isolating thermo-electric receiver 26 so that the only input seen at tunable narrow band-pass amplifier 28 originates from photo-electric cell 12. Photo-electric cell 12 then generates sinusoidal signal of a frequency dependent upon the speed of rotation of chopper blade 8, this signal after being amplified 28 is fed through triodes 173 and 191 which comprise phase shifter 29 and into and through phase splitter 31 i.e. triode 147 and into synchronous rectifier 19 which is composed of triodes 126 and 132. At the same time the amplified signal from photo-electric cell 12 is taken it is clipped and clamped by diodes 96 and 98, respectively, and amplified through tube 92 to trigger multivibrator 18 which is composed of triodes 109 and 116. The outputs of multivibrator 18 gate synchronous rectifier 19. Triodes 116 and 109 pass the signals from triode from phase splitter triode 147 to meter 33. With only an output from photo-electric cell 12 the critical phasing is that of the multivibrator as compared to the signals from phase splitter triode 147. This is accomplished by varying resistors 187 and 197 for a maximum indication on meter 33.

When shutter 11 is raised allowing heat source 27 to radiate heat upon thermo-electric receiver 26 the voltage from thermo-electric receiver 26 is in phase opposition position to the output from calibrated variable attenuator 22. Calibrated variable attenuator 22 is then adjusted until the output of voltage divider 23 is equal in amplitude to the output from thermo-electric receiver 26. This will be indicated by a null reading of meter 33. Due to slight differences in the response time of a thermo-electric receiver and a photocell a slight phase difference may be present. Variable phase shifter 29, comprising triodes 56, 63, and 78, is adjusted to equalize this slight variation. This again will be indicated by a null in meter 33.

Thus a simple photo-electric receiver response tester has been disclosed which is inexpensive in construction, simple in operation, and variable over a wide range of interruption frequencies.

Obviously many modifications and variations of the present invention are possible in the light of the above teachings. For example, synchronous rectifier 19 could be of the relay or vibrator type, etc. It is therefore to be understood, that within the scope of the appended claims,

What is claimed is:

1. A thermo-electric receiver response tester comprising a heat source in thermal radiation transfer relationship with a thermo-electric receiver under test, a shutter operable to isolate said thermo-electric receiver from said heat source, a light source, a photocell, said light source positioned for illuminating said photocell, a sine function chopper operable to interrupt said heat source and said light source sinusoidally in opposite phase relationship, a 1st amplifier connected to the output of said photocell, a 1st variable phase shifting means connected to the output of said 1st amplifier, calibrated amplitude control means, connected to the output of said 1st variable phase shifting means, summing means having 1st and 2nd inputs, said summing means 1st input connected to the output of said thermo-electric receiver, said summing means 2nd input connected to the output of said amplitude control means, a 2nd amplifier connected to the output of said summing means, a 2nd variable phase shifting means connected to the output of said 2nd amplifier, a phase splitter connected to the output of said 2nd amplifier, rectifying means connected to the output of said phase splitter, and a null indicator connected to the output of said rectifying means.

2. A thermo-electric receiver response tester comprising a heat source in thermal radiation transfer relationship with a thermo-electric receiver under test, a shutter operable to isolate said thermo-electric receiver from said heat source, a light source, a photocell, said light source positioned for illuminating said photocell, a sine function chopper operable to interrupt said heat source and said light source sinusoidally in opposite phase relationship, a 1st amplifier connected to the output of said photocell, a 1st variable phase shifting means connected to the output of said 1st amplifier, calibrated amplitude control means connected to the output of said 1st variable phase shifting means, a calibrated variable attenuator connected to the output of said amplitude control means, a voltage divider connected to the output of said variable attenuator, summing means having 1st and 2nd inputs, said summing means 1st input connected to the output of said thermo-electric receiver, said summing means 2nd input connected to the output of said voltage divider, a 2nd amplifier connected to the output of said summing means, a 2nd variable phase shifting means connected to the output of said 2nd amplifier, a phase splitter connected to the output of said 2nd amplifier, rectifying means connected to the output of said phase splitter, and a null indicator connected to the output of said rectifying means.

3. A thermo-electric receiver response tester comprising a heat source in thermal radiation transfer relationship with a thermo-electric receiver under test, a shutter operable to isolate said thermo-electric receiver from said heat source, a light source, a photocell, said light source positioned for illuminating said photocell, a chopper having a sine function chopper blade rotatably mounted with the axis of rotation midway between said thermo-electric receiver and said photocell, said blade interrupting said heat source and said light source sinusoidally in opposite phase relationship, a 1st amplifier connected to the output of said photocell, a 1st variable phase shifting means connected to the output of said 1st amplifier, calibrated amplitude control means, connected to the output of said 1st variable phase shifting means, summing means having 1st and 2nd inputs, said summing means 1st input connected to the output of said thermo-electric receiver, said summing means 2nd input connected to the output of said amplitude control means, a 2nd amplifier connected to the output of said summing means, a 2nd variable phase shifting means connected to the output of said 2nd amplifier, a phase splitter connected to the output of said 2nd amplifier, rectifying means connected to the output of said phase splitter, and a null indicator connected to the output of said rectifying means.

4. A thermo-electric receiver response tester comprising a heat source in thermal radiation transfer relationship with a thermo-electric receiver under test, a shutter operable to isolate said thermo-electric receiver from said heat source, a light source, a photocell, said light source positioned for illuminating said photocell, a chopper having a sine function chopper blade rotatably mounted with the axis of rotation midway between said thermo-electric receiver and said photocell, said blade interrupting said head source and said light source sinusoidally in opposite phase relationship, a 1st amplifier connected to the output of said photocell, a 1st variable phase shifting means connected to the output of said 1st amplifier, calibrated amplitude control means connected to the output of said 1st variable phase shifting means, a calibrated variable attenuator connected to the output of said amplitude control means, a voltage divider connected to the output of said variable attenuator, summing means having 1st and 2nd inputs, said summing means 1st input connected to the output of said thermo-electric receiver, said summing means 2nd input connected to the output of said voltage divider, a 2nd amplifier connected to the output of said summing means, a 2nd variable phase shifting means connected to the output of said 2nd amplifier, a phase splitter connected to the output of said 2nd amplifier, rectifying means connected to the output of said phase splitter, and a null indicator connected to the output of said rectifying means.

5. The thermo-electric receiver response tester of claim 4 wherein said rectifying means comprises a synchronous rectifier and means synchronizing said rectifier with the output of said 1st variable phase shifter.

6. The thermo-electric receiver response tester of claim 5 wherein said last mentioned means comprises a bistable multivibrator triggered by the output of said 1st variable phase shifter.

References Cited in the file of this patent

UNITED STATES PATENTS

| | | |
|---|---|---|
| 2,595,092 | Mounce | Apr. 29, 1952 |
| 2,648,979 | Cornett | Aug. 18, 1953 |
| 2,740,093 | Ammon | Mar. 27, 1956 |
| 2,830,191 | McCollom et al. | Apr. 8, 1958 |